UNITED STATES PATENT OFFICE.

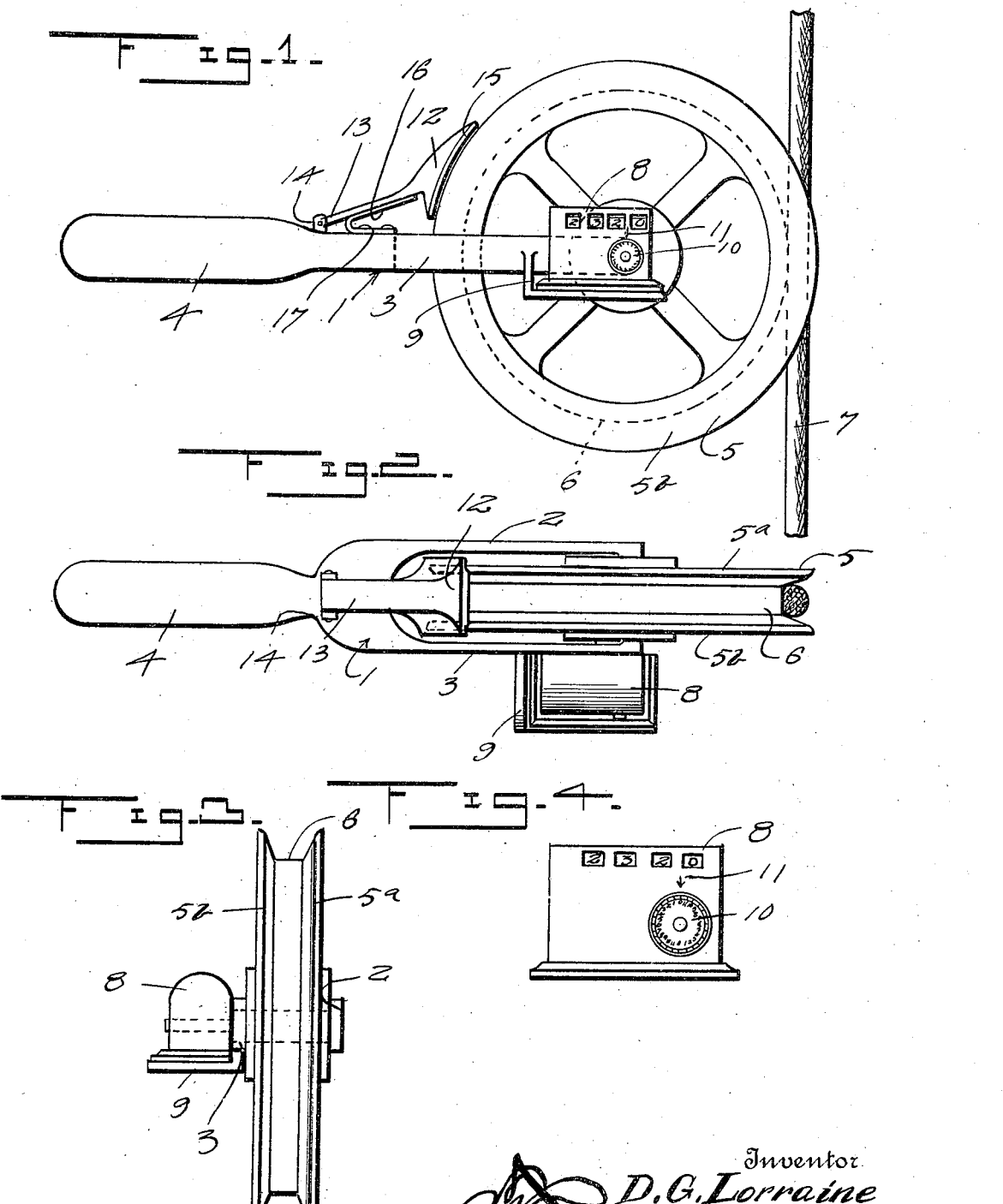

DAVID G. LORRAINE, OF TAFT, CALIFORNIA.

MEASURING DEVICE.

1,401,913.  Specification of Letters Patent.  Patented Dec. 27, 1921.

Application filed October 23, 1918. Serial No. 259,376.

*To all whom it may concern:*

Be it known that I, DAVID G. LORRAINE, a citizen of the United States, residing at Taft, in the county of Kern and State of California, have invented certain new and useful Improvements in Measuring Devices; and I do hereby declare the following to be a full, clear, and exact description of the invention, such as will enable others skilled in the art to which it appertains to make and use the same.

This invention relates to measuring devices, and more particularly to a device especially adapted for measuring the depth of wells and for similar purposes.

One of the main objects of the invention is to provide a device of the character stated of simple construction and operation by means of which the depth of a well to be measured may be readily and quickly ascertained.

A further object is to provide a device in which a measuring wheel may be actuated by a cable lowered into the well, this measuring wheel serving to operate a suitable meter, means being provided whereby rotation of the measuring wheel may be accurately controlled so as to stop operation of the meter at any desired time.

Further objects will appear from the detailed description.

In the drawings:

Figure 1 is a side view of a measuring device constructed in accordance with my invention as applied, Fig. 2 is a top plan view, Fig. 3 is a front view, and Fig. 4 is a detail of the registering instrument or meter.

In carrying my invention into effect, I employ a substantially U-shaped supporting frame 1, having the forwardly projecting spaced parallel arms 2 and 3, this frame being provided with a rearwardly extending handle 4 formed integral therewith. A grooved wheel or sheave 5 is rotatably supported between the arms 2 and 3, adjacent the inner ends thereof, this wheel being provided with a substantially flattened V-shaped peripheral groove 6, which is adapted to snugly receive a cable 7 by means of which the drilling tools or weight member may be lowered into the well to be measured. In this manner, the operating wheel 5 may be held in engagement with the cable 7 so as to be rotated thereby when the cable is lowered into the well.

Wheel 5 acts to operate a registering instrument or meter 8, which is secured on a substantially L-shaped bracket 9, projecting laterally and forwardly of arm 3 of U frame 1. This meter may be of any suitable or standard construction, and is connected directly to the supporting shaft of wheel 5, so as to be operated thereby when the wheel is rotated, as will be readily understood. The meter is provided with suitable observation openings through which may be displayed numbers for indicating the number of feet through which cable 7 has been moved, a suitable indicating disk 10 being mounted on the outer face of the casing of the meter 8, and graduated in opposite directions from diametrically opposite points from zero to eleven, these graduations representing inch marks. This disk is so connected to the wheel 5 as to be moved through a complete rotation for each rotation of the wheel, this wheel being two feet in circumference. The meter is so constructed as to have the numbers displayed through the observation opening thereof increased two points for each rotation of the wheel, the disk and the indicating mechanism of the meter thus coöperating to permit the distance through which cable 7 has been moved to be readily and accurately determined. The rotary disk 10 operates with relation to a register mark 11 in the form of an arrow on the outer face of the casing of the meter 8, so as to permit the number of inches through which this disk has been turned to be accurately determined. This meter may, as stated, be of any suitable or preferred construction, though a meter having means for indication accurately in feet and inches the distance through which cable 7 has been moved is preferred.

A brake head 12 is supported adjacent the periphery of wheel 5 by a shank 13, the outer end of which is hingedly secured, as at 14, to handle 4. This head is provided on its inner face, with an arcuate shoe 15, which is so shaped as to fit snugly between the lateral flanges 5$^a$ and 5$^b$ of wheel 5, when the head 12 is depressed, thus exerting a braking effect upon the wheel so as to positively stop rotation thereof. This head is normally held in raised or inoperative position by a bent leaf spring 16, secured to the upper face of the base of U member 1, as at 17, and engaging the under face of shank 13, adjacent the head. As will be more clearly noted from Figs. 1 and 2 of the drawings, the brake head 12 is positioned adjacent the inner end of handle 4, so as to be readily operated by exerting downward pressure with the thumb on shank 13. In this manner, rotation of wheel 5 may be easily and accurately controlled while grasping the handle 4 in the ordinary manner, thus permitting the wheel to be locked against rotation as soon as the weight or tool supported by cable 7 at the lower end thereof strikes the bottom of the well so as to slack the cable on the "pick up" of the weight, thus insuring accurate measuring of the depth of the well. Also, this renders it possible to stop the rotation of wheel 5 when the cable is being lowered, if desired, so as to measure accurately the distance between any two given points upon the cable, as for determining the depth or thickness of any stratum of materials encountered during the boring or drilling of the well.

It will be evident that there may be slight changes made in the construction and arrangement of the different parts of my invention without departing from the field and scope of the same, and I intend to include all such variations, as fall within the scope of the appended claims, in this application in which a preferred form only of my invention is disclosed.

What I claim is:

1. In a measuring device, a handle bifurcated to provide arms, a wheel rotatably supported between the arms having its peripheral edge grooved to receive a cable, a brake pivoted on the handle for depression by the hand grasping the handle, said brake extending into the groove to prevent undue lateral strain on the pivot, a spring to normally urge the brake away from the wheel, said brake resting on and being movable away from the spring to permit adjustment of its tension and a register adapted to be operated by the wheel.

2. In a measuring device, a handle bifurcated to provide arms, a wheel rotatably supported between the arms having its peripheral edge grooved to receive a cable, a brake pivoted on the handle for depression by the hand grasping the handle, said brake extending into the groove to prevent undue lateral strain on the pivot and a spring to normally urge the brake away from the wheel, said brake resting on and being movable away from the spring to permit adjustment of its tension, a bracket integral with and projecting laterally from one of the arms, and a register supported on said bracket and operated by the wheel.

In testimony whereof I affix my signature in presence of two witnesses.

DAVID G. LORRAINE.

Witnesses:
T. M. McCrary,
H. O. Kessler.